W. COOPER.
CAR LIGHTING SYSTEM.
APPLICATION FILED OCT. 13, 1909.
1,079,401.
Patented Nov. 25, 1913.
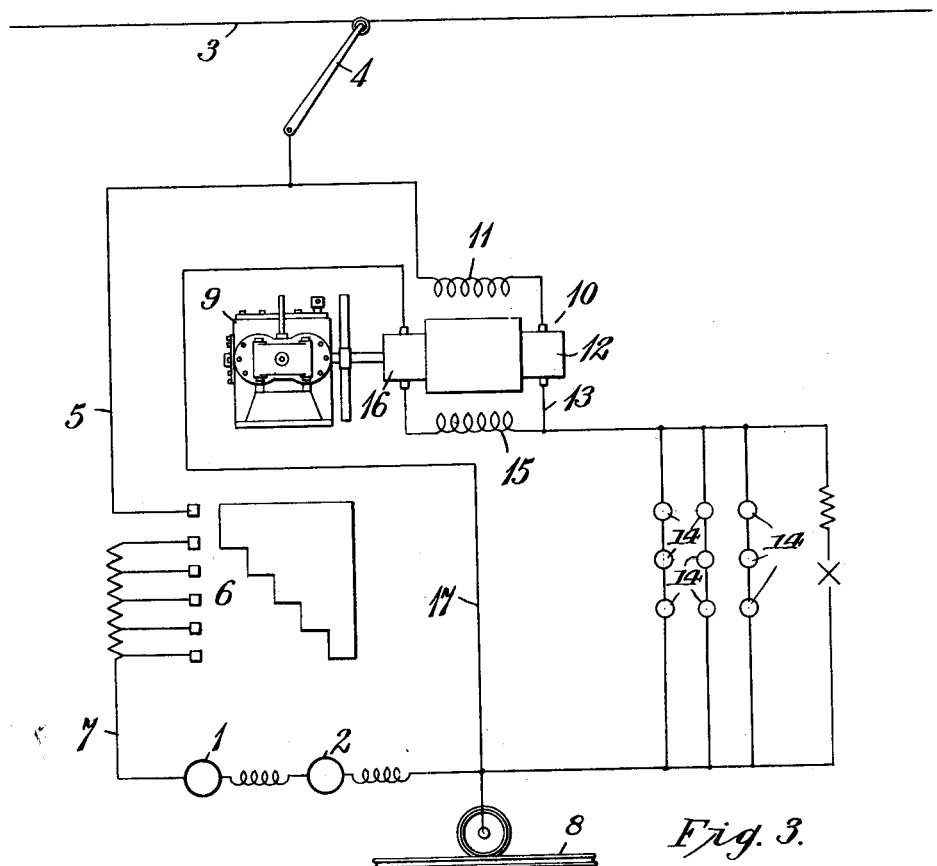
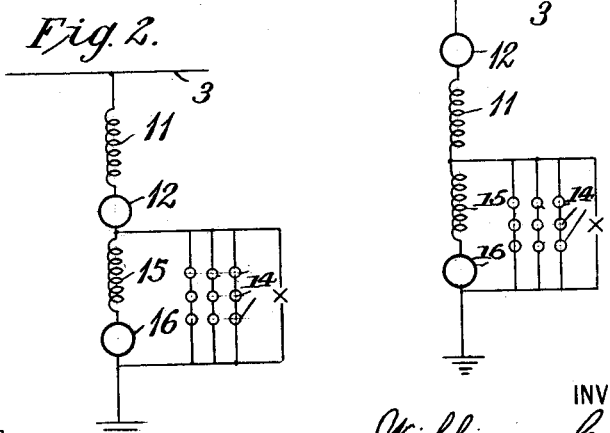
WITNESSES:
Fred H. Miller
INVENTOR
William Cooper
BY
Wesley G. Carr
ATTORNEY

UNITED STATES PATENT OFFICE.

WILLIAM COOPER, OF PITTSBURGH, PENNSYLVANIA, ASSIGNOR TO WESTINGHOUSE ELECTRIC AND MANUFACTURING COMPANY, A CORPORATION OF PENNSYLVANIA.

CAR-LIGHTING SYSTEM.

1,079,401.  Specification of Letters Patent.  Patented Nov. 25, 1913.

Application filed October 13, 1909. Serial No. 522,440.

*To all whom it may concern:*

Be it known that I, WILLIAM COOPER, a citizen of the United States, and a resident of Pittsburgh, in the county of Allegheny and State of Pennsylvania, have invented a new and useful Improvement in Car-Lighting Systems, of which the following is a specification.

My invention relates to lighting systems and particularly to such systems as are utilized with electrically propelled cars and other railway vehicles and receive their electric energy from the same source as the vehicle motors.

The object of my invention is to provide a system of the class above indicated in which the voltage applied to the lighting circuit is materially less than the trolley voltage and in which a minimum amount of auxiliary apparatus is employed on the vehicle.

According to my present invention, I provide a motor generator or dynamotor which is mechanically connected to a fluid pump or compressor for producing the necessary air pressure for operating the brakes, control systems or other pneumatic attachments with which the railway vehicle is provided, the two windings of the dynamotor being so connected in circuit relative to the electric lamps that the voltage imposed on the lighting circuit is substantially one-half of the trolley voltage. By this means I am not only able to obtain a voltage which is well adapted for lighting circuits, but, also, the arrangement is such that the speed of the motor which is employed for driving the compressor is practically independent of the number of lamps in operation.

Figure 1 of the accompanying drawings is a diagrammatic view of a system embodying my invention. Fig. 2 is a simple diagram showing the circuit relations between the dynamotor and the lamps. Fig. 3 is a view similar to Fig. 2 of a slightly modified arrangement for accomplishing the same result.

Referring to Figs. 1 and 2, the system here illustrated comprises a pair of propelling motors 1 and 2 which are supplied with energy from a supply conductor 3 through a trolley or other traveling contact device 4, a conductor 5, a controller 6, which may be replaced by any other suitable motor controller, and a conductor 7, circuit being completed from the motors through a return circuit conductor 8.

A fluid-pressure pump 9, which is adapted to maintain a predetermined pressure in the storage tank or reservoir (not shown) for operating the vehicle brakes and other pneumatic attachments, is mechanically connected to a single dynamo-electric machine 10 which is herein referred to as a dynamotor and comprises a pair of field magnet windings 11 and 15 and a pair of armature windings and commutators 12 and 16. The armature windings are not shown apart from the commutators to which they are connected and, consequently, a single reference character is utilized to designate each winding and its commutator.

The field magnet winding 11 of the dynamotor is connected directly to the traveling contact 4, circuit being continued through the armature winding and commutator 12 to a conductor 13. From this point two circuits are completed, one through lamps 14 and the other through the field magnet winding 15, armature winding and commutator 16 of the dynamotor and a conductor 17 to the return circuit conductor 8, the circuit arrangement being clearly shown in Fig. 2.

The device will operate in substantially the same manner if the circuit positions of the field magnet winding 11 and the armature winding and commutator 12 are interchanged as shown in Fig. 3 of the drawings.

If the two field windings and the two armature windings are respectively alike, the voltage impressed on the lighting circuit is substantially constant and is equal to one half of the voltage of the supply circuit. The voltage impressed on the lighting circuit is not affected by changes in either the compressor or the lighting loads. Furthermore, changes in the lighting load have no effect on the field excitation or the speed of the dynamotor. Consequently, one or more of the lamp groups may be open circuited without affecting the voltage on the other lamps or the speed of the dynamotor. The speed of the machine will depend upon its load but changes in speed of the dynamotor do not affect the voltage of the lighting circuit.

The foregoing statements may be explained and their correctness demonstrated as follows: Assuming a supply circuit voltage of 1200, the voltage of the lighting circuit is then 600, since the two armature windings are alike and are operating at the same speed and under the same field conditions and the field windings are alike. If a current of ten amperes traverses the field winding 11 and the armature winding 12 (Fig. 2), 12000 watts power is supplied to the dynamotor and the lamps. If a current of 4 amperes is flowing in the 600 volt. lighting circuit, the lamps consume 2400 watts, leaving 9600 watts to be supplied to the dynamotor. Of this amount 6000 watts are consumed in the windings 11 and 12 and the remaining, 3600 watts, are consumed in the windings 15 and 16. There is evidently a current of 10 amperes traversing field winding 11 and a current of six amperes traversing field winding 15, which is equivalent to sixteen amperes in one of the field windings. If, with the same lighting load, the mechanical load is reduced to 3600 watts, the total power is 6000 watts, and five amperes must traverse the windings 11 and 12, one ampere will then traverse windings 15 and 16, the field current being equivalent to six amperes in one of the windings. Thus, it is evident that the total field current and, therefore, the speed of the dynamotor, is proportional to the mechanical load. Assuming that the mechanical load is 3600 watts and that the lighting load is increased to 4800 watts, so that eight amperes traverse the 600 volt. lighting circuit, the total power then becomes 8400 watts, so that seven amperes must traverse the windings 11 and 12. Under these conditions, the windings 15 and 16 act as a generator and supply one ampere to the lighting circuit. The generator current in the field winding 15 produces a field which opposes the field produced by the seven amperes in the winding 11 and, therefore, the effective field current is 7-1 which equals six amperes, as in the previous case. Thus, it appears that fluctuations in the lighting load do not vary the speed or the effective field current in the dynamotor.

By the use of a single dynamo-electric machine, which replaces a compressor motor, I secure a lighting circuit, the voltage of which is relatively low and is independent of the load and speed of the dynamo-electric machine, which acts as an ordinary series motor.

It is evident that variations may be effected in the connections of the system within the spirit and scope of my invention.

I claim as my invention:

1. A lighting system for electric vehicles comprising a dynamotor, a source of electric energy to which the dynamotor is connected, and a lighting circuit connected in shunt circuit relation to a portion of the dynamotor winding.

2. A lighting system comprising a supply circuit, a dynamo-electric machine comprising a two-part field magnet winding and two armature windings connected in series relation across the circuit, a mechanical load driven by said machine and a lighting circuit connected to an intermediate point in the circuit of the dynamo-electric machine at one end and to one side of the supply circuit at the other.

3. A lighting system comprising a supply circuit, a dynamotor having two armature windings and a two-part field magnet winding connected in series relation across the supply circuit, a mechanical load for the dynamotor and a lighting circuit connected in shunt relation to a portion of the dynamotor winding.

4. A lighting system comprising a supply circuit, a dynamo-electric machine comprising a two-part field magnet winding and two armature windings connected in series relation across the circuit, a mechanical load driven by said machine and a lighting circuit connected to a point in the circuit of the dynamo-electric machine between the two armatures and between the two field windings at one end, and to one side of the supply circuit at the other end.

5. In an electrical vehicle, the combination with a source of energy and a dynamotor comprising a divided field magnet winding and two armature windings, said field magnet and armature windings being connected in series circuit relation across the supply circuit, of a mechanical load for said dynamotor and a lighting circuit which is connected at one end to an intermediate point in the circuit composed of the series of dynamotor windings and at its other end to one side of the supply circuit.

In testimony whereof, I have hereunto subscribed my name this 5th day of October, 1909.

WILLIAM COOPER.

Witnesses:
EDWARD L. WILDER,
B. B. HINES.